United States Patent

[15] 3,662,462

Shiflet

[45] May 16, 1972

[54] METHOD OF SECURING A BEARING RACE WITHIN A BORE IN A HOUSING

[72] Inventor: Robert H. Shiflet, Chula Vista, Calif.

[73] Assignee: Rohr Corporation, Chula Vista, Calif.

[22] Filed: Feb. 9, 1970

[21] Appl. No.: 9,689

[52] U.S. Cl. ............................................. 29/149.5 B, 29/441
[51] Int. Cl. ................................... B21d 53/10, B23p 11/00
[58] Field of Search ............... 29/149.5 B, 149.5, 200 B, 441, 29/148.4 A

[56] References Cited

UNITED STATES PATENTS 3,068,552   12/1962   Williams et al. ................... 29/149.5 B
3,444,606   5/1969   Jones ..................................... 29/200 B Primary Examiner—Thomas H. Eager
Attorney—George E. Pearson

[57] ABSTRACT

An annular shoulder which retains a bearing race in a bore is deformed in two steps in each of which the annular, beveled edge of a staking anvil is pressed into a groove which defines one side of said shoulder. In the first deforming step the staking side of the beveled edge of the staking anvil is disposed at an angle of 45° relative to the axis of the aforesaid bore. In the second deforming step the staking side of the beveled edge of the staking anvil is disposed at an angle of 60° relative to said bore axis, and greater pressure is exerted against the shoulder.

6 Claims, 6 Drawing Figures

PATENTED MAY 16 1972　3,662,462

INVENTOR.
R. H. SHIFLET

BY Edwin D. Grant

ATTORNEY

INVENTOR.
R. H. SHIFLET
BY
Edwin D. Grant
ATTORNEY

INVENTOR.
R. H. SHIFLET

BY

Edwin D. Grant

ATTORNEY

METHOD OF SECURING A BEARING RACE WITHIN A BORE IN A HOUSING

BACKGROUND OF THE INVENTION

In modern aircraft a large number of parts are provided with spherical bearings the races of which are fixedly positioned within bores in various structures, hereinafter referred to as bearing housings. Often such a bearing has annular grooves formed in opposite sides of its race, and to hold the bearing within the bore of its housing the edge portions of said race which lie outside said grooves are pressed, or staked, over chamfers formed on the edges of said bore. Also in some cases an annular groove is formed in a bearing housing in concentric relation with the edge of the bore in which a spherical bearing is to be seated, and the edge portion of said housing which lies between said groove and the wall of said bore is staked over a chamfered edge of the bearing race. The development of large and powerful jet-propelled aircraft has required that both spherical bearings and bearing housings in such aircraft be made of high-strength alloys, and consequently great difficulty has been encountered in attempts to secure such bearings in housings by the conventional anvil staking procedure which consists of pressing the annular edge of a single staking tool into the aforesaid groove on the bearing race or housing to thereby deform the metal adjacent said groove. More specifically, the use of a single staking tool to install relatively large diameter, high strength spherical bearings in housings causes various unacceptable installation defects, including distortion in the bearing races and cracking in the retaining lips of said races or their housings.

SUMMARY OF THE INVENTION

This invention relates to a method of deforming the edge of a high-strength bearing race or the edge of a high-strength bearing housing, which method is capable of fixedly securing said race and housing to each other without installation defects of the type previously enumerated.

In contrast with the conventional anvil staking method for securing the races of spherical bearings within bores of their housings, which as stated hereinabove involves the use of a single staking tool, the anvil staking method disclosed herein is performed with different staking anvils in two separate steps. In the first step of staking in accordance with the invention, the annular, beveled edge of a first staking anvil is pressed into an annular groove defining a shoulder which when deformed secures a spherical bearing within the bore of a bearing housing, the bearing race or housing on which said shoulder is formed being fixed in position during this operation. The side of the anvil edge which contacts the retaining shoulder (hereinafter referred to as the staking side) is disposed at an angle of 45° relative to the longitudinal axis of the bore in which the bearing race is positioned, and when the first anvil is pressed into the aforesaid annular groove under a first predetermined pressure the shoulder is only partially displaced toward the position which it is designed to assume in order to prevent movement of the bearing race in one direction relative to said bore. In the second step of the method of the invention, the annular, beveled edge of a second staking anvil is pressed into the groove on the bearing race or housing, the pressure exerted against the second staking anvil being greater than that exerted against the first staking anvil. The staking side of the beveled edge of the second staking anvil is disposed at an angle of 60° relative to the longitudinal axis of the bore in the bearing housing, and in the second staking step the retaining shoulder on the housing or bearing race is displaced to a position which prevents movement of the bearing race in one direction relative to said bore. The staking anvils are provided with centering posts which align them in proper position relative to the bearing race while the retaining shoulder is being deformed. The method which has been briefly described eliminates the installation defects which occur when spherical bearings are staked within bores of bearing housings by use of a single staking tool in a one step process.

DESCRIPTION OF THE DRAWINGS

In the drawings like reference numbers designate like parts.

DETAILED DESCRIPTION

Figure 1:
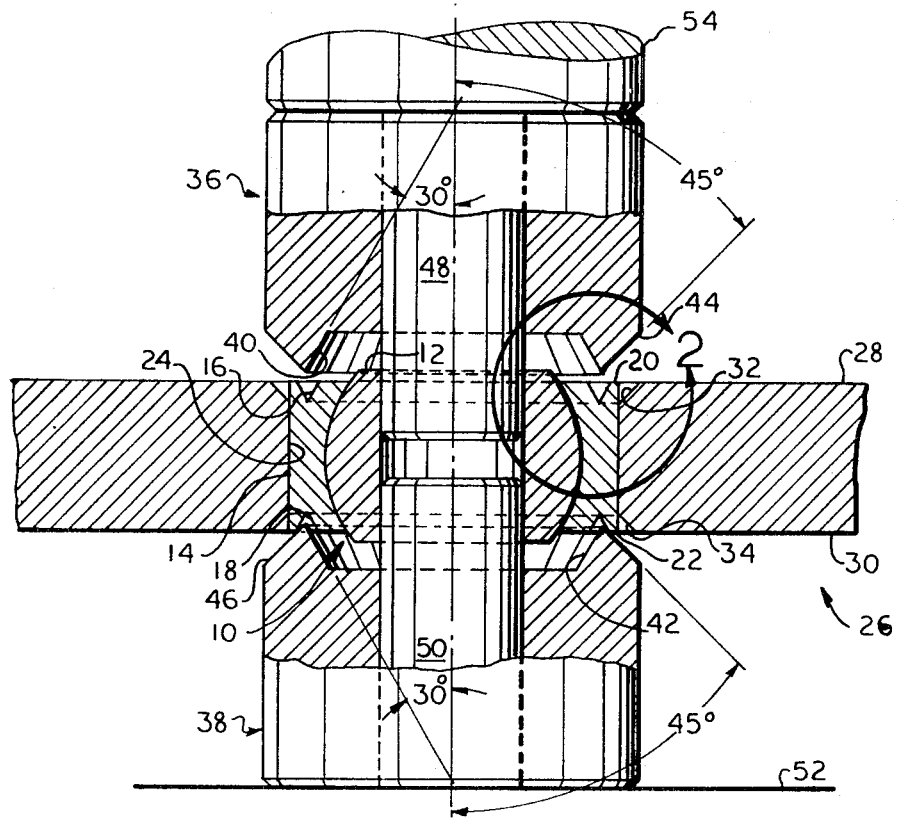
FIG. 1 is a sectional view of a spherical bearing and its housing, the drawing also illustrating in partially sectional view a pair of first staking anvils used in performing the first step of the staking method disclosed herein.
Figure 2:
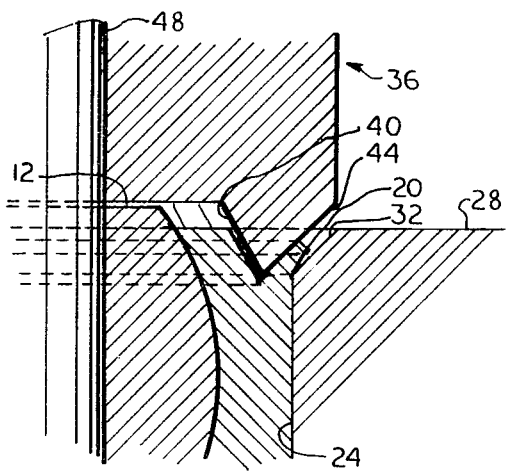
FIG. 2 is an enlarged view of the sections of the aforesaid bearing and housing which are enclosed within the circle in FIG. 1, the drawing illustrating the lowest position of a typical one of said first staking anvils.

In FIG. 1 reference number 10 designates generally a spherical bearing comprising an apertured member 12 a portion of the surface of which is spherical and snugly fitted within the spherical inner wall of an annular race 14. An annular, V-shaped groove 16, 18 is formed in each side of race 14 in spaced, concentric relation with its peripheral wall, thus defining annular shoulders 20, 22 at the edges of said wall. The sides of the aforesaid grooves are inclined at an angle of 30° relative to the longitudinal axis of race 14, so that the included angle between the sides of each groove is 60°. The race is snugly seated within the bore 24 of a bearing housing which is designated generally by reference number 26 and the opposite sides 28, 30 of which are perpendicular to the longitudinal axis of said bore and respectively substantially coplanar with the sides of said race. Each edge of bore 24 is formed with a chamfer 32, 34 which is disposed at an angle of 45° relative to the longitudinal axis of the bore.

The same drawing illustrates a pair of first staking anvils designated generally by reference numbers 36, 38. Each of these anvils is annular and has at one end thereof an annular, beveled edge the inner side 40, 42 of which is disposed at an angle of 30° relative to the longitudinal axis of the anvil and the staking side 44, 46 of which is disposed at an angle of 45° relative to said axis. A cylindrical centering post 48, 50 is fixedly positioned within the aperture in each first anvil and projects outwardly from the end of the anvil on which the aforesaid beveled edge is formed, the diameter of said post being slightly less than the diameter of the aperture in member 12 of bearing 10 and the length of the projecting portion of said post being such that the ends of the posts are spaced from each other when said posts are positioned within said aperture and the staking sides 44, 46 of the anvils respectively abut the outer edges of grooves 16 and 18 as illustrated in FIG. 1. The edge of each first staking anvil at which the 30° and 45° surfaces thereof meet (hereinafter referred to as the apex of the staking anvil) has a radius of curvature in the range of about 0.010 to about 0.015 inch and before said edge is rounded the distance between two diametrically opposed points thereon is 0.005 inch (plus or minus 0.0005 inch) less than the center-to-center distance of each groove 16, 18 (said center-to-center distance being measured at the center of the slightly rounded bottom of the groove). It should also be noted that the thickness of race 14 (i.e., the distance between the surfaces in which grooves 16 and 18 are formed) should be equal to, or not more than 0.010 inch greater than, the thickness of housing 28, and the width of the chamfers on said housing (i.e., the horizontal distance in FIG. 1 between the inner and outer edges of a chamfer) and the depth of each groove in said race should be as specified in the following table:

TABLE I

| Bearing Race Groove Depth | Housing Chamfer Width |
| --- | --- |
| 0.015–0.030 inch | 0.010–0.020 inch × 45° |
| 0.025–0.040 inch | 0.020–0.030 inch × 45° |
| 0.045–0.060 inch | 0.025–0.035 inch × 45° |

In the first step of the staking method disclosed herein, one of the anvils 36, 38 is supported on a fixedly positioned worktable 52 and the ram 54 of a press is placed against the other anvil and moved toward said worktable to thereby press the beveled edges of the anvils into grooves 16 and 18, respectively, the pressure exerted against race 14 being maintained at a substantially constant level for a predetermined time. The pressure applied during the first staking step, as well as the time during which said pressure is applied, will depend on the size of race 14 and the material of which it is made, but the applied pressure should be sufficient to press the beveled edges of the anvils into the grooves of the race and partially displace shoulders 20, 22 toward the chamfered edges of bore 24 of housing 28. For a spherical bearing having a race formed of a high-strength metal such as Haynes No. 25 alloy and having a race diameter of 2.25 inches, it is preferable to apply a pressure of about 18,000 p.s.i. against the race for 30 seconds. Preferably the ends of the centering posts 48, 50 of the anvils abut each other when the shoulders 20, 22 have been displaced as far as is desired in the first staking step.

Figure 3:
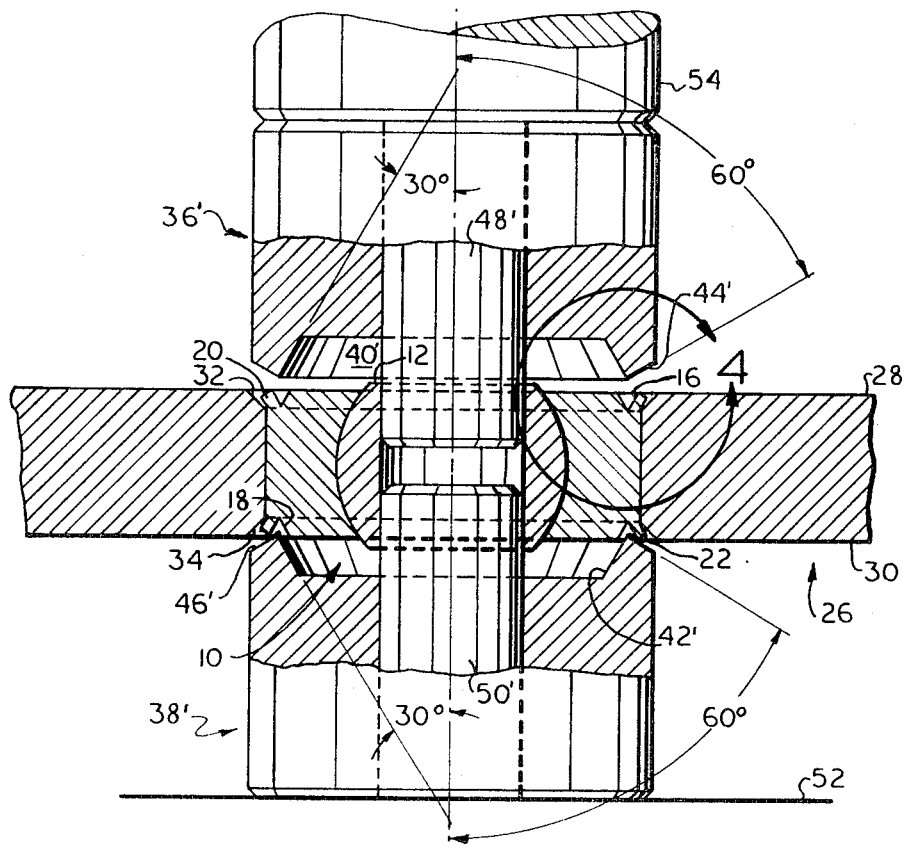
FIG. 3 is a sectional view of the same bearing and housing, the drawing also illustrating in partially sectional view a pair of second staking anvils used in performing the second step of the disclosed staking method.

To perform the second step of the method of the invention, the first anvils 36, 38 are replaced by second staking anvils which are identical in construction to said first anvils except for the angle of the staking sides of their beveled edges. Thus as illustrated in FIG. 3, the second staking anvils 36'38' comprise cylindrical posts 48', 50' which are adapted to align the beveled edges of the anvils with respective ones of the grooves 16, 18 in race 14 when the posts are inserted within the aperture in member 12 of bearing 10. The inner sides 40', 42' of the edges of anvils 36', 38' are disposed at angle of 30° relative to their longitudinal axes, whereas the staking sides 44', 46' are disposed at an angle of 60° relative to said axes. The radius of curvature of the apices of the second anvils 36', 38' and the distance between diametrically opposed points thereon (before the apices are rounded) is the same as described in connection with the first anvils 36, 38.

Figure 4:
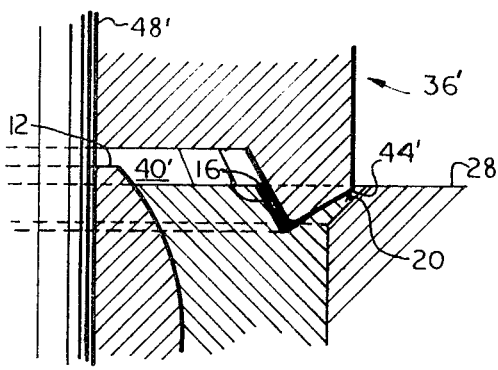
FIG. 4 is an enlarged view of the sections of the bearing and housing which are enclosed within the circle in FIG. 3, the drawing illustrating the lowest position of a typical one of said second staking anvils.

The pressure used to press the beveled edges of the second staking anvils 36', 38' into the grooves in race 14 will of course also depend upon the size of the race and the material of which it is made, but will be greater than that employed with the first anvils 36, 38. For a race made of the aforementioned Haynes No. 25 alloy and having a diameter of 2.25 inches, the shoulders 20, 22 of the race can be properly staked against the chamfers 32, 34 of the bearing housing by applying a pressure of about 36,000 p.s.i. against the race for 30 seconds. The final position of one of the shoulders in abutment with the adjacent chamfer on housing 28 is illustrated in FIG. 4.

Figure 5:
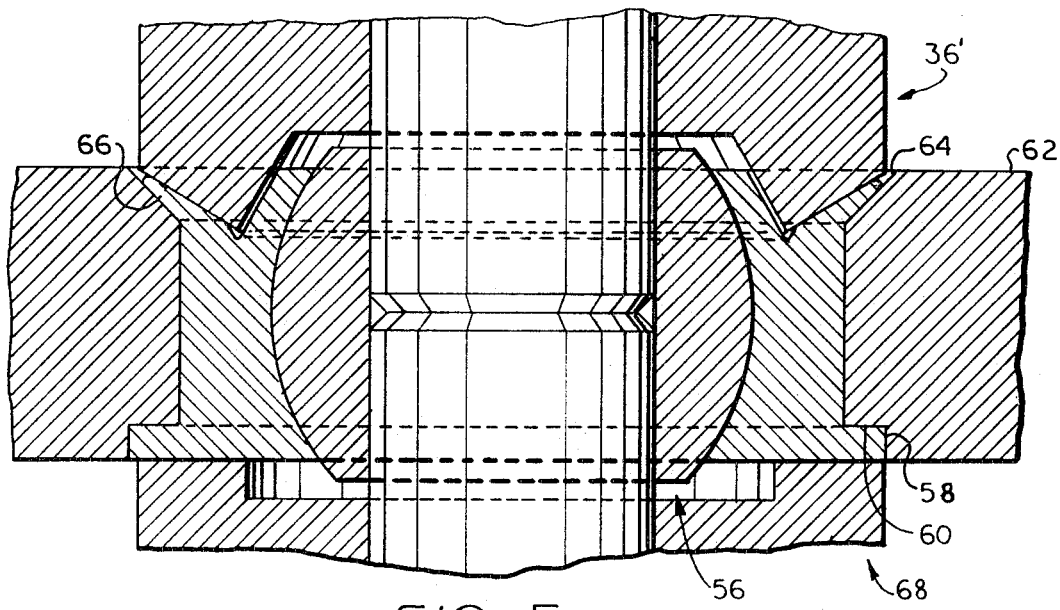
FIGS. 5 and 6 are sectional views of two other types of spherical bearings and housings which can be staked together by the method of the invention.
Figure 6:
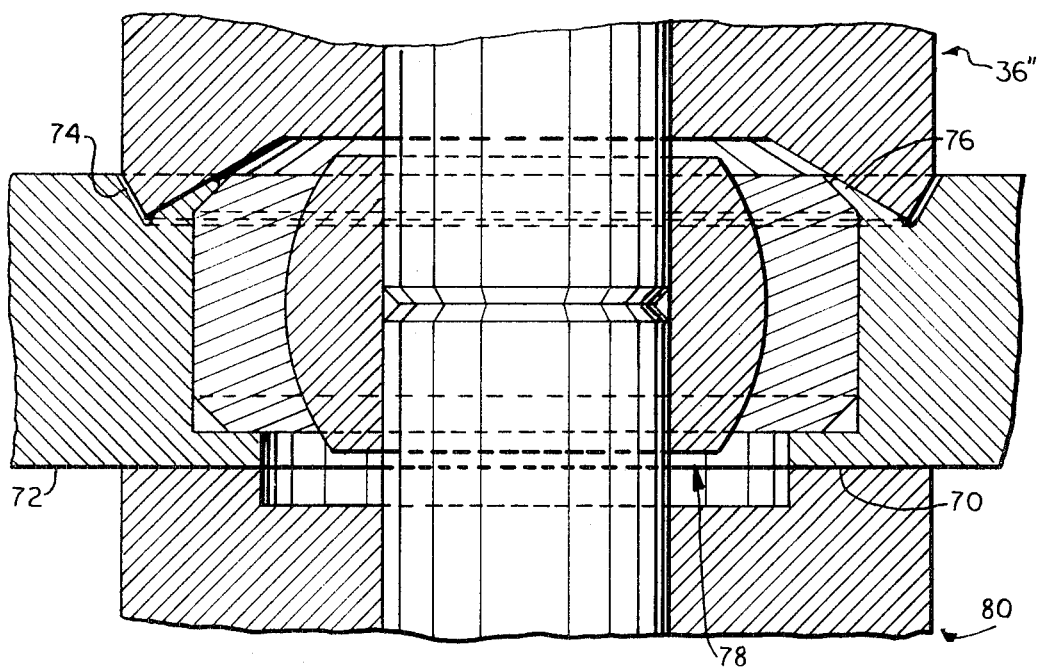

FIG. 5 illustrates an assembly wherein one side of the race of a spherical bearing 56 is provided with a flange 58 which conformably fits within a counterbore 60 at one end of a bore in a bearing housing 62, the opposite edge of said bore being formed with a chamfer 64 against which a shoulder 66 on the other side of said race is pressed in order to secure the bearing to the housing. In accordance with the staking method of this invention, the race of bearing 56 is supported on the flat, annular end of a support anvil 68 and first and second staking anvils which have the same form as anvils 36 and 36' illustrated in FIGS. 1 and 3, respectively, are used to stake shoulder 66 against chamfer 64, the second staking anvil 36' being illustrated in FIG. 5. In the assembly illustrated in FIG. 6 a flange 70 is formed at one end of the bore in a bearing housing 72 and an annular, 60° V-shaped groove 74 is formed in the opposite side of said housing in spaced, concentric relation with the edge of said bore, thus forming an annular shoulder 76 on the housing which is staked against the chamfered edge of the race of a spherical bearing 78 in order to secure the latter to said housing. In accordance with the method of the invention, two different staking anvils are also used to deform shoulder 76, but on these anvils the inner sides of their beveled edges contact said shoulder. Hence the outer side of the beveled edge of the first staking anvil (not shown) used to displace shoulder 76 is disposed at an angle of 30° relative to the longitudinal axis of said anvil, and the inner side of the same anvil is disposed at an angle of 45° relative to said axis. The outer side of the beveled edge of the second staking anvil 36" is also disposed at an angle of 30° relative to the longitudinal axis of said anvil, and the inner side of the same anvil is disposed at an angle of 60° relative to said axis. During the staking operations, housing 72 is supported on the flat, annular end of a support anvil 80. The center-to-center diameter of groove 74 preferably should be equal to $D_1$ plus 2 $D_2$, where $D_1$ is the nominal outside diameter of the race of bearing 78 (i.e., the dimension midway between the allowable minimum and maximum outside diameters of said race) and $D_2$ is the width of the chamfers on said race (i.e., the horizontal distance in FIG. 6 between the inner and outer edges of one of said chamfers). The apices of the first and second anvils used to deform shoulder 76 against the adjacent chamfered edge of the bearing race have the same radius of curvature as the apices of the first and second staking anvils employed in staking the bearing race shoulders illustrated in FIGS. 1 – 5, namely, a radius of curvature in the range of 0.010 to about 0.015 inch. The distance between two diametrically opposed points on the apex of each of the anvils (before said apex is rounded) should be 0.005 inch (plus or minus 0.0005 inch) greater than the center-to-center diameter of groove 74, and the surface of the race of bearing 78 which is uppermost in FIG. 6 should be coplanar with, or not more than 0.010 inch above the surface of housing 72 which is also uppermost in the same drawing. Lastly, the width of the upper chamfer on the race of bearing 78 and the depth of groove 74 should be as specified in the following table.

TABLE II

| Housing Groove Depth | Bearing Race Chamfer depth |
| --- | --- |
| 0.015–0.030 inch | 0.010–0.020 inch × 45° |
| 0.025–0.040 inch | 0.020–0.030 inch × 45° |
| 0.045–0.060 inch | 0.025–0.035 inch × 45° |

As has been mentioned hereinbefore, the previously employed method of staking together spherical bearing races and housings which are made of high-strength alloys, and which have a diameter greater than 1.5 inches, resulted in many unacceptable installation defects, such as binding of the rotatable member of the bearings, distortion of the bearing races, and cracking of shoulders formed on said races or on their housings for the purpose of securing the same together. The disclosed staking method has been found extremely effective in eliminating such installation defects in the same bearings and housings, and thus is of great utility in the manufacture of jet aircraft in which large numbers of such bearings are required.

Various modifications can obviously be made in the construction and arrangement of the staking anvils which have been disclosed, without departing from the broad concept of the invention. Hence the scope of the invention should be considered to be limited only by the terms of the appended claims.

What is claimed as new and useful and is desired to be secured by U.S. Letters Patent is:

1. In the process of securing a bearing race within a bore in a housing by deforming a shoulder defined on one of said race and said housing by an annular V-shaped groove therein, the steps of:

initially deforming said shoulder by pressing the annular, beveled edge of a first staking anvil into said groove, the staking side of said edge being disposed at an angle of about 45° relative to the longitudinal axis of said bore; and then deforming said shoulder by pressing the annular, beveled edge of a second staking anvil into said groove, the staking side of said edge being inclined at an angle of about 60° relative to the longitudinal axis of said bore.

2. The process of claim 1 wherein:

the pressure applied to said shoulder by said second staking anvil is greater than that applied to said shoulder by said first staking anvil.

3. The process of claim 1 wherein:

said shoulder is formed on said race; and said race is supported on a support anvil while said shoulder is being deformed.

4. In the process of securing the race of a spherical bearing within a bore in a housing by deforming a shoulder defined on said race by an annular V-shaped groove concentrically spaced from the peripheral edge thereof, the steps of:

supporting the side of said race which is remote from said shoulder on a support anvil having a cylindrical centering post which fits snugly within the aperture in the rotatable member of said bearing;

initially deforming said shoulder by pressing the annular beveled edge of a first staking anvil into said groove, the staking side of said edge being inclined at an angle of about 45° relative to the longitudinal axis of said bore, said first staking anvil including a cylindrical centering post which is coaxial with said edge and which fits snugly within the aperture in the rotatable member of said bearing; and then deforming said shoulder by pressing the annular, beveled edge of a second staking anvil into said groove, the staking side of said edge being inclined at an angle of about 60° relative to the longitudinal axis of said bore, said second staking anvil including a cylindrical centering post which is coaxial with said edge and which fits snugly within the aperture in the rotatable member of said bearing.

5. In the process of securing the race of a spherical bearing within a bore in a housing by deforming shoulders defined on said race by annular V-shaped grooves respectively concentrically spaced from the peripheral edges of opposite sides thereof, the steps of:

initially deforming said shoulders by simultaneously pressing into each of said grooves the annular, beveled edge of a first staking anvil, the staking side of said edge being inclined at an angle of about 45° relative to the longitudinal axis of said bore, each first staking anvil including a cylindrical centering post which is coaxial with said edge and which fits snugly within the aperture in the rotatable member of said bearing; and then deforming said shoulders by simultaneously pressing into each of said grooves the annular, beveled edge of a second staking anvil, the staking side of said edge being inclined at an angle of about 60° relative to the longitudinal axis of said bore, each second staking anvil including a cylindrical centering post which is coaxial with said edge and which fits snugly within the aperture in the rotatable member of said bearing.

6. In the process of securing the race of a spherical bearing within a bore in a housing by deforming a shoulder defined on said housing by an annular V-shaped groove concentrically spaced from the edge of said bore, the steps of:

supporting the side of said housing which is remote from said shoulder on a support anvil having a cylindrical centering post which fits snugly within the aperture in the ball of said bearing;

initially deforming said shoulder by pressing the annular, beveled edge of a first staking anvil into said groove, the staking side of said edge being inclined at an angle of about 45° relative to the longitudinal axis of said bore, said first staking anvil including a cylindrical centering post which is coaxial with said edge and which fits snugly within the aperture in the rotatable member of said bearing; and then deforming said shoulder by pressing the annular, beveled edge of a second staking anvil into said groove, the staking side of said edge being inclined at an angle of about 60° relative to the longitudinal axis of said bore, said second staking anvil including a cylindrical centering post which is coaxial with said edge and which fits snugly within the aperture in the rotatable member of said bearing.

\* \* \* \* \*